United States Patent Office 3,197,481
Patented July 27, 1965

3,197,481
PHOSPHINYL IMIDES AND METHOD
FOR THEIR PREPARATION
Roger Williams Addor, Pennington, N.J., assignor to American Cyanamid Company, Stamford, Conn., a corporation of Maine
No Drawing. Filed Sept. 20, 1962, Ser. No. 225,136
14 Claims. (Cl. 260—327)

The present invention relates to novel phosphinyl imides and to processes for their preparation.

This application is a continuation-in-part application of applications for United States Letters Patent Serial No. 113,670, filed May 3, 1961, now abandoned, and Serial No. 170,224, filed January 31, 1962, now abandoned.

The phosphinyl imides of the present invention may be represented by the general formula:

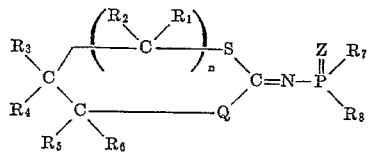

wherein $R_1$, $R_2$, $R_3$, $R_4$, $R_5$ and $R_6$ which may be the same or different, represent hydrogen, lower alkyl halo (lower) alkyl, lower carbalkoxy, phenyl, napthyl, a substituted phenyl or aralkyl; $R_7$ and $R_8$ which may be the same or different, represent lower alkyl, phenyl, lower alkoxy, alkylthio, or lower alkylamino radicals; Q and Z represent sulfur or oxygen atoms; and $n$ is an integer from 0 to 1.

In general, the compounds of the present invention may be conveniently synthesized by initially preparing the appropriate 2-imino-derivative of the desired hetero sulfur moiety and, thereafter, effecting reaction between the latter hetero sulfur moiety and the phosphorus-containing compound such as an O,O-dialkylphosphorohalothioate, O,O-dialkylphosphorohaloate, O-alkyl alkanephosphonohalothioate, O - alkyl - N - mono - alkylphosphoroamidohaloate, O - alkyl - N,N - dialkylphosphoroamidohalothioate, N,N' - dialkylphosphorodiamidohalothioate, O-alkyl phenylphosphonohalothioate, O,O-diphenylphosphorohaloate, or the like.

The over-all reaction may be graphically written as:

[I] 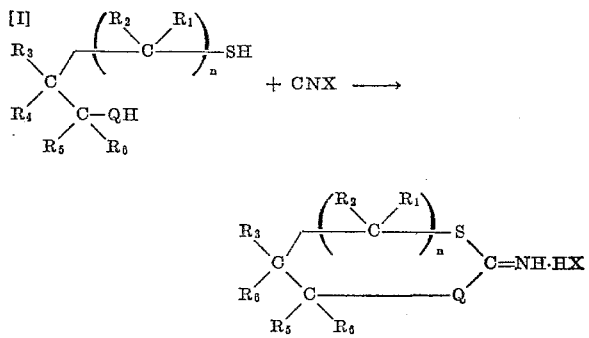

[II] 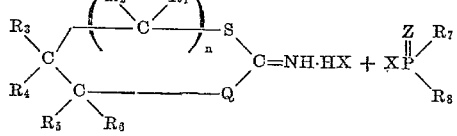

↓

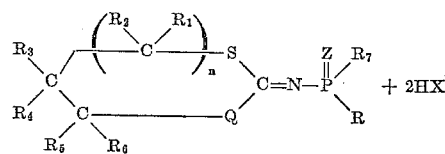

wherein Q and Z are each an atom of either oxygen or sulfur, $n$ is an integer from 0 to 1; X is halogen, such as fluorine, chlorine, bromine or iodine; $R_1$, $R_2$, $R_3$, $R_4$, $R_5$ and $R_6$ are hydrogen, lower alkyl from 1 to 7 carbon atoms, such as methyl, ethyl, n-propyl, isopropyl, t-butyl, sec. pentyl or n-hexyl, lower carbalkoxy, such as carbomethoxy or carbethoxy, carbamyl, N-methyl carbamyl, halogen such as chlorine or bromine, cyano, acetoxyalkyl such as acetoxymethyl, methoxy, alkylthio, haloalkyl, such as chloromethyl or bromoethyl, an aryl substituent, such as phenyl, naphthyl, halogen-substituted phenyl, such as p-chlorophenyl, o-bromophenyl or o,p-dichlorophenyl, lower alkyl-substituted phenyl, such as tolyl, xylyl, p-nitrophenyl, o-cyanophenyl, m-methoxyphenyl, p-methylthiophenyl, carbamylphenyl, N-methylcarbamylphenyl, carbomethoxyphenyl, carbethoxyphenyl or sulfamylphenyl, aralkyl, such as benzyl or β-phenylethyl; $R_7$ and $R_8$ are lower alkyl radicals, such as methyl, ethyl, n-propyl, isopropyl, butyl, hexyl or heptyl, phenyl, lower alkoxy, such as methoxy, ethoxy or butoxy, lower alkylthio, such as methylthio or ethylthio, and lower alkyl amino radicals, such as methylamino, dimethylamino, ethylamino, diethylamino, di-n-propylamino or diisopropylamino.

The mono- or di-thiol reactants employed in Equation I hereinabove include illustratively: ethane-1,2-dithiol, 1-hydroxy-2-mercapto-ethane, propane-1,2-dithiol, propane-1,3-dithiol, 1-mercapto-3-hydroxypropane, 2-methylpropane-1,3-dithiol, n-butane-1,2-dithiol, 2-ethylpropane - 1,3 - dithiol, 2,5 - dimethylhexane 3,4 - dithiol, phenylethane-1,2-dithiol, o-cyanophenylethane-1,2-dithiol, o-tolylethane-1,2-dithiol, 3-phenylpropane-1,2-dithiol, p-nitrophenylethane-1,2-dithiol, o-methoxyphenylethane - 1,2 - dithiol, o - carbethoxyphenylethane - 1,2-dithiol, p-sulfamylphenylethane-1,2-dithiol, m-carbamylphenylethane - 1,2 - dithiol, o - carbamylphenyl - 2-mercaptoethanol, 2 - p - ethylthiophenylpropane - 1,3-dithiol, p-acetylphenylethane-1,2-dithiol, o-thiocyanoethane-1,2-dithiol, 3-chloropropane-1,2-dithiol, carbomethoxyethane - 1,2 - dithiol, α - naphthylethane - 1,2 - dithiol, β-naphthylethane-1,2-dithiol, 1-α-naphthylpropane-1,3-dithiol, 1-β-naphthylpropane-1,3-dithiol, 2-α-naphthylpropane - 1,3 - dithiol, 2 - β - naphthylpropane - 1,3 - dithiol, homologs and isomers of the aforementioned thiols.

The cyanogen halide reactant employed in the process of the invention is preferably cyanogen chloride. However, cyanogen bromide, cyanogen iodide, cyanogen fluoride, or mixtures thereof, may also be employed advantageously.

It has been found that, where a dithiol reactant is employed in Equation I above, the rate of reaction and yield of resultant 2-imino dithioheterocyclic moiety are markedly increased when utilizing an acidified alcoholic catalyst during reaction. Where a mercaptoalcohol, such as mercaptoethanol, is employed as the reactant in Equation I above, the aforementioned monohydric aliphatic alcohol can be conveniently omitted from the catalyst mixture so that the rate of reaction and yield are increased by using the acid catalyst alone.

Illustrative catalysts include: dry hydrogen chloride, dry hydrogen bromide, boron trifluoride, aluminum chloride and p-toluene sulfonic acid in combination with a monohydric aliphatic alcohol of from one to four carbon atoms, such as methanol, ethanol, isopropyl alcohol, n-butanol, t-butanol, or the like. In general, from 0.1% to 5% each of the aforementioned acid and alcohol by weight, based on the weight of the thiol reactant is utilized for optimum results. It has been further found that a good practice for realizing ready recovery of the imino intermediate prepared by reacting a thiol and cyanogen halide is to carry out the acid-alcoholic catalyzed reaction in a non-aqueous, inert solvent, as for instance, toluene, chloroform or ethylene glycol dimethyl ether.

In general, typical phosphorohalothioates or the phosphorohaloate reactants employed in Equation II above are:

O,O-dimethyl phosphorochloridothioate,
O,O-diethyl phosphorochloridothioate,
O-methyl, O-ethyl phosphorochloridothioate,
O,O-di-iso-propyl phosphorobromidothioate,
O,O-di-n-butyl phosphorochloridothioate,
O,O-di-sec-pentyl phosphoroiodothioate,
O,O-dimethyl phosphorochloridate,
O,O-diethyl phosphorochloridate,
O-ethyl ethane phosphonochloridothioate,
O-ethyl-N,N-dimethyl phosphoramidochloridothioate,
O-ethyl, phenylphosphonochloridothioate,
O-ethyl-N-isopropyl phosphoramidochloridothioate,
O-ethyl-N-methyl phosphoramidochloridothioate,
Diethylphosphorochloridotrithioate, and
Diethylphosphinothioyl bromide.

It has been found that both illustrated reactions may be carried out in sequence without separation of the several reaction products, or they may be carried out stepwise. Advantageously, the reaction represented by Equation II is carried out in the presence of an acid acceptor, which may be either an organic or inorganic base. Contemplated, for example are: sodium hydroxide, potassium hydroxide, lithium bicarbonate, sodium bicarbonate, triethyl amine and sodium acetate. Base, sufficient to neutralize the imino hydrohalide and the acid formed during reaction, is provided for optimum results.

The imides of the present invention possess insecticidal, acaricidal and nematocidal activity. They can also be employed as plasticizers and as ore-beneficiating reagents.

To facilitate a further understanding of the present invention, the following illustrative examples are presented. These are not to be taken as limitative of the invention. Unless otherwise stated, the parts are by weight and the analyses are in percent.

EXAMPLE 1

*Preparation of 2-imino-1,3-dithiolane hydrochloride*

Into a mixture of 210 parts of toluene and 2.0 parts of ethanol in a suitable three-neck flask equipped with a stirrer, ice-water cooled condenser, thermometer and gas inlet tube is introduced hydrogen chloride as a gas for six minutes at a moderate rate. Titration of a 5.0 part aliquot of the toluene mixture in a homogeneous methanol-water mixture shows the hydrogen chloride concentration to be 0.12 molar. Ethane-1,2-dithiol (108.6 parts) is then added. The gas inlet tube is raised above the liquid surface and gaseous cyanogen chloride addition is begun from a tared cylinder. The rate of addition is 0.37 part per minute and solid product begins to appear after about twenty-five minutes. The initial reaction temperature is 21° C. and rises spontaneously to 50° C. after eighty minutes.

A room temperature water bath is placed in contact with the reaction flask so that the heat of reaction is controlled and is further maintained at between about 40° C. and 50° C. Over a period of three and one-half hours, 76 parts of cyanogen chloride are added. After removal of the cooling bath and an additional forty-two minute reaction period, infrared examination of the toluene mixture shows that less than about five percent of ethane-1,2-dithiol can be detected. To insure that the reaction has gone to completion, the reaction slurry is left undisturbed for an additional forty-five minutes. Then, the thick slurry is diluted with toluene and poured into a Büchner funnel. The solids are successively washed with additional portions of toluene and petroleum ether, respectively. After vacuum-drying, 179.3 parts of finely divided 2-imino-1,3-dithiolane hydrochloride, having a melting point of 212° C.–216° C. with decomposition, are obtained. The yield corresponds to 91.2% of theory based on ethane-1,2-dithiol.

In the foregoing example, similar results are obtained where cyanogen bromide is substituted for cyanogen chloride.

EXAMPLE 2

This example illustrates the effect of modifying the catalyst by omitting the alcohol.

Example 1 is repeated in every material detail, except that a total of 41 parts of cyanogen chloride is slowly added over a period of four hours to a mixture of 95.0 parts of ethane-1,2-dithiol and 200 parts of anhydrous toluene containing solely hydrogen chloride at a concentration of 0.22 molar. At the termination of an additional twenty-four hours, the reaction mixture is examined by infrared spectrum. The presence of substantial quantities of cyanogen chloride is detected indicating that, even after more than twenty-four hours, the reaction has not gone to completion.

Upon recovery of 2-imino-1,3-dithiolane hydrochloride as in Example 1, there are obtained 43.9 parts or 42.2%, based on added cyanogen chloride.

EXAMPLE 3

*Preparation of 2-imino-1,3-oxathiolane hydrochloride*

Into a mixture of 300 parts of chloroform in the apparatus described in Example 1 above, is passed dry hydrogen chloride for several minutes. Titration of an aliquot of the chloroform mixture shows the hydrogen chloride concentration to be 0.36 molar. After adding 89.4 parts of 1-hydroxy-2-mercaptoethane, 83.5 parts of gaseous cyanogen chloride are then passed into the mixture over a two and one-half hour period. The reaction temperature during this period is maintained at about 40° C. by external cooling of the three-necked flask. After an hour at room temperature, all the solids formed are collected on a Büchner funnel and washed with chloroform. Resultant dry, colorless 2-imino-1,3-oxathiolane hydrochloride is weighed and there are obtained 97.7 parts or 60.6% of theory.

TABLE I—Continued

| Compound | Percent Kill | | | 2-Spotted Spider Mites |
|---|---|---|---|---|
| | Aphids | | | |
| | Concentration | | | |
| | .1% | .01% | .001% | 0.1% |
| CH₂—S\C=N—P(S)(OCH₃)₂ / CH₂—S | 100 | 100 | 90 | 100 |
| CH₂—S\C=N—P(S)(OC₂H₅)₂ / CH₂—S | 100 | 100 | 100 | 100 |
| CH₂—S\C=N—P(S)(OC₂H₅)₂ / CH₂—O | 90 | 33 | -------- | 100 |
| CH₃-CH—S\C=N—P(S)(OCH₃)₂ / CH₂—S | 100 | 100 | 100 | 98 |
| CH₂—S\CH₂ CH₂—S / C=N—P(S)(OC₂H₅)₂ | 100 | 100 | 28 | 100 |
| CH₂—S\C=N—P(O)(OCH₃)₂ / CH₂—S | 100 | 100 | 100 | 100 |
| CH₂—S\C=N—P(O)(OC₂H₅)₂ / CH₂—S | 100 | 100 | 100 | 100 |
| CH₂—S\C=N—P(S)(OCH(CH₃)CH₃)₂ / CH₂—S | 100 | 100 | 100 | 100 |
| CH₃-CH—S\C=N—P(S)(OC₂H₅)₂ / CH₂—S | 100 | 100 | 100 | 100 |
| C₆H₅\S–S\=N—P(S)(OC₂H₅)₂ | 100 | 100 | 100 | 100 |
| S–S\C=N—P(OC₂H₅)(C₂H₅) | 100 | 100 | 83 | 100 |
| S–S\C=N—P(S)(OC₂H₅)(N(CH₃)₂) | 100 | 100 | 49 | 100 |
| CH₂—S\C=N—P(S)(OCH₂CH₂CH₃)₂ / CH₂—S | 100 | 100 | 100 | 100 |
| CH₂—S\C=N—P(S)(OCH₃)(OC₂H₅) / CH₂—S | 100 | 100 | 100 | 100 |
| CH₃-CH—S\C=N—P(O)(OC₂H₅)₂ / CH₂—S | 100 | 100 | 100 | 100 |

TABLE I—Continued

| Compound | Percent Kill | | | 2-Spotted Spider Mites |
|---|---|---|---|---|
| | Aphids | | | |
| | Concentration | | | |
| | .1% | .01% | .001% | 0.1% |
| (CH₃)₂C(S−)(CH₂S−)C=N−P(S)(OC₂H₅)₂ | 100 | 100 | 100 | 100 |
| (CH₃CH−S)(CH₃CH−S)C=N−P(S)(OC₂H₅)₂ | 100 | 100 | 100 | 100 |
| (CH₂−S)(CH₂)(CH₂−S)C=N−P(S)(OCH₃)₂ | 100 | 100 | 80 | 100 |
| (CH₂−O)(CH₂−S)C=N−P(O)(OC₂H₅)₂ | 100 | 100 | 0 | 100 |
| (CH₃CH−O)(CH₂−S)C=N−P(S)(OC₂H₅)₂ | 100 | 59 | 0 | 100 |
| CH₃CH₂CH₂CH₂−CH−S, CH₂−S C=N−P(S)(OC₂H₅)₂ | 100 | 100 | 100 | 100 |
| C₆H₅−CH₂−CH−S, CH₂−S C=N−P(S)(OC₂H₅)₂ | 100 | 100 | 64 | 100 |
| Naphthyl−CH−S, CH₂−S C=N−P(S)(OC₂H₅)₂ | 100 | 50 | --- | --- |
| Cl−C₆H₄−CH−S, CH₂−S C=N−P(S)(OC₂H₅)₂ | 100 | 100 | 100 | 100 |
| (CO₂C₂H₅)C₆H₄−CH−S, CH₂−S C=N−P(S)(OC₂H₅)₂ | 100 | 100 | 70 | 100 |
| (CH₃)C₆H₄−CH−O, CH₂−S C=N−P(S)(OC₂H₅)₂ | 100 | 100 | 100 | 100 |
| O₂N−C₆H₄−CH−S, CH₂−S C=N−P(O)(OC₂H₅)₂ | 100 | 80 | --- | 100 |
| (OCH₃)C₆H₄−CH−O, CH₂−S C=N−P(O)[OCH(CH₃)₂]₂ | 100 | 100 | 50 | 100 |

TABLE I

| Compound | Percent Kill | | | |
|---|---|---|---|---|
| | Aphids | | | 2-Spotted Spider Mites |
| | Concentration | | | |
| | .1% | .01% | .001% | 0.1% |
| 3-CH₃S-C₆H₄-CH(S-)CH₂-S-C=N-P(O)[OCH(CH₃)₂]₂ | 100 | 100 | 100 | 100 |
| 4-H₂NSO₂-C₆H₄-CH(S-)CH₂-S-C=N-P(S)(OC₂H₅)₂ | 100 | 80 | ---- | 100 |
| 3-NO₂-C₆H₄-CH(O-)CH₂-S-C=N-P(S)(OCH₃)₂ | 90 | ---- | ---- | 100 |
| 2-Cl-C₆H₄-CH(S-)CH₂-S-C=N-P(O)(OC₂H₅)₂ | 100 | 100 | 100 | 100 |
| 4-Cl-C₆H₄-CH(S-)CH₂-S-C=N-P(S)[N(CH₃)₂](OC₂H₅) | 100 | 40 | ---- | 70 |
| 4-H₂NCO-C₆H₄-CH(S-)CH₂-S-C=N-P(S)(OCH₃)₂ | 100 | 100 | 70 | 100 |
| C₆H₅-CH(S-)CH₂-S-C=N-P(O)(OCH₃)₂ | 100 | 100 | 18 | 100 |
| ClCH₂-CH(S-)CH₂-S-C=N-P(S)(OC₂H₅)₂ | 100 | 100 | 80 | 100 |
| CH₃OC(O)-CH(S-)CH₂-S-C=N-P(S)(OC₂H₅)₂ | 100 | 18 | ---- | 87 |
| (CH₂-S)₂C=N-P(S)(NHCH₃)(OC₂H₅) | 90 | 0 | ---- | ---- |
| (CH₂-S)₂C=N-P(S)(C₆H₅)(OC₂H₅) | 100 | 100 | 0 | 80 |
| (CH₂-S)₂C=N-P(O)(C₂H₅)(OC₂H₅) | 100 | 100 | 100 | ---- |

EXAMPLE 4

*Preparation of 2-imino-5-methyl-1,3-oxathiolane hydrochloride*

To 200 parts of reagent grade toluene partially saturated with dry hydrogen chloride are added 104.3 parts of 1-mercapto-2-hydroxypropane. Gaseous cyanogen chloride (74.8 parts) is added over a four hour period while the exothermic reaction which occurs is maintained at 30° C.–35° C. by cooling with a water bath. Stirring is continued for an additional hour and the crystalline iminohydrochloride is collected on a Büchner funnel, washed with ether, and dried. The product weighs 149.8 parts which is 86.1% of theory, based on the mercaptopropanol used.

The infrared absorption curve is identical to that for a sample of 2-imino-5-methyl-1,3-oxathiolane hydrochloride prepared by known methods from propylene oxide and hydrothiocyanic acid.

EXAMPLE 5

*Preparation of 2-imino-4-methyl-1,3-dithiolane hydrochlorie*

Employing the apparatus of Example 1 above, dry hydrogen chloride is passed rapidly into a mixture of 25 parts of chloroform and 0.2 part of ethanol for ten minutes. After addition of 7.8 parts of propane-1,2-dithiol, 5.3 parts of cyanogen chloride are introduced over an eighty minute period. The solids which form are collected and amount to 10.9 parts or 89% of theory of 2-imino-4-methyl-1,3-dithiolane hydrochloride. When the latter is recrystallized from ethanol, it melts at 166° C.–170° C. with decomposition.

Analysis for $C_4H_8ClNS_2$—Calculated: C, 28.31; H, 4.75. Found: C, 28.15; H, 4.95.

EXAMPLE 6

*Preparation of 2-imino-1,3-dithiane hydrochloride*

To a mixture of 130 parts of chloroform and 1.3 parts of ethanol nearly saturated with dry hydrogen chloride in a flask equipped with a stirrer, ice-water cooled condenser, gas inlet tube and thermometer are added 27.7 parts of propane-1,3-dithiol. Subsequent slow addition of gaseous cyanogen chloride over a two hour period causes a spontaneous temperature rise to 42° C. A total of 18 parts of cyanogen chloride is metered into the flask. After completion of cyanogen chloride addition, the mixture is heated at 50° C.–55° C. for one hour. The crystalline product amounts to 24.1 parts or 55.5% of theory. The sample is sublimed at 95° C.–100° C./0.05 mm. for analysis. It melts with darkening at 155° C.–160° C.

Analysis for $C_4H_8ClNS_2$—Calculated: C, 28.31; H, 4.75; Cl, 20.89. Found: C, 27.99; H, 5.18; Cl, 20.89.

EXAMPLE 7

*Preparation of 2-imino-4-phenyl-1,3-dithiolane hydrochloride*

Dry hydrogen chloride is passed rapidly into a mixture of 40 parts of chloroform and 0.4 part of ethanol for ten minutes. After addition of 20.8 parts of phenyl-ethane-1,2-dithiol, 8.7 parts of cyanogen chloride are added over an eighty minute period. The solids which form amount to 25.7 parts or 90.5% of theory of 2-imino-4-phenyl-1,3-dithiolane hydrochloride. A vacuum sublimed sample melts at 195° C.–200° C. with decomposition.

Analysis for $C_9H_{10}ClNS_2$—Calculated: C, 46.63; H, 4.35; Cl, 15.30; N, 6.04; S, 27.67. Found: C, 46.71; H, 4.32; Cl, 15.03; N, 6.02; S, 27.93.

EXAMPLE 8

*Preparation of 2-dimethoxyphosphinothioylimino-1,3-dithiolane*

To a stirred mixture of 42.0 parts of 2-imino-1,3-dithiolane hydrochloride and 43.3 parts of O,O-dimethylphosphorochloridothioate in 400 parts of dry acetone are slowly added 54.5 parts of dry triethylamine. The addition rate is maintained so that the spontaneous temperature rise does not exceed 35° C. When the addition is completed, the temperature is maintained at 35° C. for two hours. Triethylamine hydrochloride is collected and the acetone stripped from the mother liquor. Resultant concentrate is diluted with chloroform and the mixture is then washed with dilute sodium bicarbonate solution, dilute hydrochloric acid, water, saturated salt solution and is filtered through magnesium sulfate. Stripping off the solvent in an evaporator yields 44.2 parts, or 70.1% of theory, of the iminophosphate. The latter is further purified by molecular distillation.

Analysis for $C_5H_{10}NO_2PS_3$—Calculated: C, 24.68; H, 4.14; P, 12.73; S, 39.54. Found: C, 24.68; H, 4.45; P, 12.54; S, 39.26.

EXAMPLE 9

Example 8 is repeated in every detail except that potassium carbonate is substituted for triethylamine. Corresponding 2-dimethoxyphosphinothioylimino-1,3 - dithiolane compound is recovered in good yield.

EXAMPLE 10

*Preparation of 2-dimethoxyphosphinothioylimino-4-methyl-1,3-dithiolane*

The procedure of Example 8 is followed in every detail, except that 2-imino-4-methyl-1,3-dithiolane hydrochloride is reacted in lieu of 2-imino-1,3-dithiolane hydrochloride. Resultant oily product obtained in good yield is purified by dissolving it in ether and reprecipitating the deisred product by addition of petroleum ether. The infrared absorption spectrum is that expected for the product showing a strong $>C=N-$ band at 1550 cm.$^{-1}$.

EXAMPLE 11

*Preparation of 2-dimethoxyphosphinothioylimino-4-p-carbamylphenyl-1,3-dithiolane*

Following the procedure of Example 8 in every detail, except that for the 2-imino-1,3-dithiolane hydrochloride reactant 2-imino-4-p-carbamylphenyl-1,3-dithiolane hydrochloride is substituted, resultant oily product, 2-dimethoxyphosphinothioylimino - 4-p-carbamylphenyl-1,3-dithiolane, shows a strong $>C=N-$ band at 1552 cm.$^{-1}$ by means of infrared analysis.

EXAMPLE 12

*Preparation of 2-dimethoxyphosphinylimino-1,3-dithiolane*

To a mixture of 39.8 parts of O,O-dimethylphosphorochloridate and 42.8 parts of 2-imino-1,3-dithiolane hydrochloride in 250 parts of dry benzene are added over a ninety minute period 76 parts (by volume) of triethylamine in 85 parts of benzene. After an additional three hours, triethylamine hydrochloride is collected and the filtrate is concentrated under vacuum. The concentrate is purified by molecular distillation at .001 mm. Hg. between 100° C. and 105° C. to yield a product having both a refractive index ($n_D^{25}$) equal to 1.5683 at 25° C. and a strong $>C=N-$ band in the infrared spectrum at 1560 cm.$^{-1}$.

Analysis for $C_5H_{10}NO_3PS_2$.—Calculated: C, 26.42; H, 4.44; S, 28.22; P, 13.63. Found: C, 26.59; H, 4.73; S, 28.26; P, 13.88.

EXAMPLE 13

*Preparation of 2-diethoxyphosphinothioylimino-1,3-dithiolane*

To a stirred mixture of 44.0 parts of 2-imino-1,3-dithiolane hydrochloride and 53.4 parts of O,O-diethylphosphorochloridothioate in 100 parts of water and 200 parts of benzene are added 51.0 parts of sodium acetate in 100 parts of water over a thirty-minute period. After stirring for sixty hours, the benzene layer is separated and the water layer extracted once with ether. The combined ether-benzene mixture is washed with dilute sodium carbonate solution, then with water and dried. The solvent and some unreacted chloridothioate are stripped off under reduced pressure in a film-type evaporator. On standing, the product crystallizes. Washing off the solids with petroleum ether (30° C.–60° C.) yields 40.6 parts, or 56.3% of theory, of the iminophosphate having a melting point of 36.5° C.–38.8° C. A molecularly distilled sample analyzes as follows.

Analysis for $C_7H_{14}NO_2PS_3$.—Calculated: C, 30.98; H, 5.20; P, 11.41; S, 35.54. Found: C, 30.80; H, 4.99; P, 11.66; S, 35.67.

EXAMPLE 14

*Preparation of O-ethoxy-O-methoxyphosphinothioylimino-1,3-dithiolane*

Following the procedure of Example 13, except that O-ethyl-O-methyl phosphorochloridothioate is substituted for the O,O-diethylphosphorochloridothioate reactant, the product, O - ethoxy-O-methoxyphosphinothioylimino-1,3-dithiolane, is obtained in good yield having a refractive index ($n_D^{25}$) equal to 1.6080 and analyzes for $C_6H_{12}NO_2PS_3$ as follows.

Calculated: C, 28.00; H, 4.70; N, 5.44; P, 12.04; S, 37.37. Found: C, 27.86; H, 4.73; N, 5.42; P, 12.14; S, 37.54.

EXAMPLE 15

*Preparation of 2-diethoxyphosphinothioylimino-4-α-naphthyl-1,3-dithiolane*

Following the procedure of Example 13 in every detail, except that 2-imino-4-α-naphthyl-1,3-dithiolane hydrochloride is substituted for the 2-imino-1,3-dithiolane hydrochloride reactant of that example, resultant product, 2-diethoxyphosphinothioylimino - 4-α-naphthyl-1,3-dithiolane, is recovered in good yield having a characteristic strong >C=N— absorption band in the infrared spectrum at 1562 reciprocal centimeters.

EXAMPLE 16

*Preparation of 2-diethoxyphosphinothioylimino-4-benzyl-1,3-dithiolane*

Following the procedure of Example 13 in every detail, except that 2-imino-4-benzyl-1,3-dithiolane hydrochloride is substituted for the 2-imino-1,3-dithiolane reactant of that example, 2-diethoxyphosphinothioylimino-4-benzyl-1,3-dithiolane is obtained in good yield and has a refractive index ($n_D^{25}$) equal to 1.6066. The product analyzes as:

Calculated: C, 46.51; H, 5.58; N, 3.88; P, 8.59; S, 26.61. Found: C, 46.52; H, 5.56; N, 4.06; P, 8.86; S, 26.80.

EXAMPLE 17

*Preparation of 2-diethoxyphosphinothioylimino-4-n-butyl-1,3-dithiolane*

The procedure of Example 13 is repeated in every detail, except that 2-imino-4-n-butyl-1,3-dithiolane hydrochloride is substituted for the 2-imino-1,3-dithiolane hydrochloride reactant. Resultant product, 2-diethoxyphosphinothioylimino-4-n-butyl-1,3-dithiolane is obtained in good yield having a refractive index ($n_D^{25}$) equal to 1.5629 and analyzes as:

Calculated: C, 40.34; H, 6.77. N, 4.28; P, 9.46; S, 29.38. Found: C, 40.19; H, 6.72; N, 4.22; P, 9.68; S, 29.30.

EXAMPLE 18

*Preparation of 2-diethoxyphosphinothioylimino-4-carbmethoxy-1,3-dithiolane*

Example 13 above is repeated in every detail except that 2-amino-4-carbmethoxy-1,3-dithiolane hydrochloride is substituted for the 2-imino-1,3-dithiolane hydrochloride. The 2-diethoxyphosphinothioylimino-4-carbmethoxy-1,3-dithiolane thus obtained in good yield has a refractive index ($n_D^{25}$) equal to 1.5767 and analyzes as:

Calculated: C, 32.81; H, 4.90; N, 4.25; S, 29.20; P, 9.40. Found: C, 32.82; H, 4.90; N, 4.32; S, 29.14; P, 9.20.

EXAMPLE 19

*Preparation of 2-diethoxyphosphinothioylimino-4-chloromethyl-1,3-dithiolane*

Example 13 is repeated in every detail, except that 2-imino-4-chloromethyl-1,3-dithiolane hydrochloride is employed in lieu of 2-imino-1,3-dithiolane hydrochloride. The 2 - diethoxyphosphinothioylimino - 4 - chloromethyl-1,3-dithiolane formed has a refractive index ($n_D^{25}$) equal to 1.5948 and analyzes as:

Calculated: C, 30.04; H, 4.73; Cl, 11.09; S, 30.08. Found: C, 29.98; H, 4.70; Cl, 1092; S, 30.01.

EXAMPLE 20

*Preparation of 2-diethoxyphosphinothioylimino-4,4-dimethyl-1,3-dithiolane*

Following the procedure of Example 13 in every detail, except that 2-imino-4,4-dimethyl-1,3-dithiolane hydrochloride is employed in lieu of the dithiolane hydrochloride reactant of Example 13, a good yield of 2-diethoxyphosphinothioylimino-4,4 - dimethyl - 1,3 - dithiolane, having a refractive index ($n_D^{25}$) equal to 1.5724, is obtained which analyzes as:

Calculated: C, 36.10; H, 6.06; N, 4.68; P, 10.35; S, 32.13. Found: C, 35.90; H, 5.96; N, 4.90; P, 10.39; S, 31.95.

EXAMPLE 21

*Preparation of 2-diethoxyphosphinothioylimino-4,5-dimethyl-1,3-dithiolane*

Example 20 is repeated in every detail, except that 2-imino-4,5-dimethyl-1,3-dithiolane hydrochloride is substituted for 2-imino-4,4-dimethyl-1,3-dithiolane hydrochloride. Resultant 2-diethoxyphosphinothioylimino-4,5-dimethyl-1,3-dithiolane, having a refractive index ($n_D^{25}$) equal to 1.5739, is recovered in good yield and analyzes as:

Calculated: C. 36.10; H, 6.06; H, 4.68; P, 10.35; S, 32.13. Found: C, 36.03; H, 6.45; N, 4.66; P, 10.51; S, 32.17.

EXAMPLE 22

*Preparation of 2-diethoxyphosphinothioylimino-1,3-oxathiolane*

To a stirred mixture of 10.6 parts of 2-imino-1,3-oxathiolane hydrochloride and 15.8 parts of O,O-diethylphosphorochloridothioate in 100 parts of dry acetone are added 25.6 parts (by volume) of an acid acceptor, dry ethylamine, over a thirty minute period. The temperature rises to 35° C. during addition and is maintained at 40° C. for an additional three hours. After collecting the triethylamine hydrochloride, the acetone is stripped off and the concentrate is diluted with ether. The mixture is washed with dilute hydrochloric acid, then with water and dried. The latter is concentrated employing a thin-film evaporator. A yield of 13.0 parts, or 67.0% of theory, of the desired iminophosphate is obtained. The sample is molecularly distilled at 100° C. (20μ).

Analysis for $C_2H_{14}NO_2PS_2$.—Calculated: C, 32.93; H, 5.53; P, 12.13; S, 25.12. Found: C, 33.05; H, 5.76; P, 12.20; S, 25.05.

EXAMPLE 23

*Preparation of 2-diethoxyphosphinothioylimino-5-o-methylphenyl-1,3-oxathiolane*

Following the procedure of Example 22 in every detail, except that 2-imino-5-o-methylphenyl-1,3-oxathiolane hydrochloride is substituted for the 2-imino-1,3-oxathiolane hydrochloride, resultant oily product, 2-diethoxyphosphinothioylimino-5-o-methylphenyl-1,3 - oxathiolane, is recovered in good yield having an infrared absorption spectrum showing a strong >C=N— band at 1555 cm.$^{-1}$.

EXAMPLE 24

*Preparation of 2-dimethoxyphosphinothioylimino-5-m-nitrophenyl-1,3-oxathiolane*

The procedure of Example 22 is repeated in every detail, except that for the 2-imino-1,3-oxathiolane hydrochloride and O,O-diethylphosphorochloridothioate reactants 2-imino-5-m-nitrophenyl-1,3-oxathiolane hydrochloride and O,O-dimethylphosphorochloridothioate are substituted. The resultant product, 2-dimethoxyphosphinothioylimino-5-m-nitrophenyl-1,3-oxathiolane, is an oil which shows by means of an infrared absorption spectrum a strong >C=N— absorption band at 1562 cm.$^{-1}$.

EXAMPLE 25

*Preparation of 2-diethoxyphosphinylimino-1,3-oxathiolane*

Repeating the procedure of Example 12 in every detail, except that O,O-diethylphosphorochloridate and 2-imino-1,3-oxathiolane are substituted for the O,O-dimethylphosphorochloridate and 2-amino-1,3-dithiolane, respectively, resultant product, 2-diethoxyphosphinylimino-1,3-oxathiolane is recovered in good yield having a refractive index ($n_D^{25}$) equal to 1.4892 and analyzes as follows.

Calculated: C, 35.14; H, 5.90; N, 5.85; P, 12.95; S, 13.40. Found: C, 34.80; H, 5.81; N, 5.69; P, 12.62; S, 13.10.

EXAMPLE 26

*Preparation of 2-diethoxyphosphinothioylimino-4-methyl-1,3-oxathiolane*

The procedure of Example 22 is followed in every detail, except that for the 2-imino-1,3-oxathiolane reactant of that example 2-imino-4-methyl-1,3-oxathiolane hydrochloride is substituted and 2-diethoxyphosphinothioylimino-4-methyl-1,3-oxathiolane is recovered in good yield. It possesses a refractive index ($n_D^{25}$) equal to 1.5396 and analyzes as:

Calculated: C, 35.68; H, 6.09; N, 5.20; P, 11.50; S, 23.81. Found: C, 35.83; H, 5.94; N, 5.27; P, 11.48; S, 24.05.

EXAMPLE 27

*Preparation of 2-diethoxyphosphinothioylimino-1,3-dithiane*

A mixture of 3.2 parts of 2-imino-1,3-dithiane hydrochloride, 4.0 parts of O,O-diethylphosphorochloridothioate, and 3.4 parts of sodium acetate in 25 parts of benzene and 15 parts of water is stirred vigorously at 40° C.–50° C. for three hours. The temperature is allowed to rise to 60° C.–65° C. and stirring is continued for an additional two hours. The benzene phase is separated and the water phase is extracted once with ether. The total organic phase is washed with water, dilute hydrochloric acid, dilute sodium carbonate solution, and dried in the usual way. Removal of solvent leaves 4.9 parts of oil contaminated with starting chloridothioate. Molecular distillation at 100° C./3–5μ yields 0.89 part or 16.5% of theory of product, $n_D^{25}$ equal to 1.600, having a strong band in the infrared absorption spectrum at 1530 cm.$^{-1}$ attributable to the >C=N— function.

Analysis for C$_8$H$_{16}$NO$_2$PS$_3$—Calculated: C, 33.67; H, 5.65. Found: C, 34.27; H, 5.55.

EXAMPLE 28

*Preparation of 2-dimethoxyphosphinothioylimino-1,3-dithiane*

Following the procedure of Example 27 in every detail, except that O,O-dimethylphosphorochloridothioate is employed instead of the O,O-diethylphosphorochloridothioate reactant, resultant 2-dimethoxyphosphinothioylimino-1,3-dithiane is recovered in good yield having a refractive index ($n_D^{25}$) equal to 1.6248 and analyzing as follows.

Calculated: C, 28.00; H, 4.70; N, 5.44; P, 12.04; S, 37.38. Found: C, 27.73; H, 5.77; N, 5.25; P, 11.70; S, 37.08.

EXAMPLE 29

*Preparation of 2-diethoxyphosphinoylimino-1,3-dithiolane*

To a mixture of 6.0 parts of O,O-diethylphosphorochloridate and 4.7 parts of 2-imino-1,3-dithiolane hydrochloride in 75 parts of dry acetone are added over 15 minutes 6.1 parts of triethylamine. The reaction temperature is maintained below 35° C. by external cooling. After three hours, 7.9 parts of triethylamine hydrochloride are collected. Acetone is then removed from the filtrate under vacuum and the 7.6 parts of residual oil are purified by molecular distillation at .001 mm. Hg between 100° C.–105° C. giving a 64% yield of pure product, $n_D^{25}$ equal to 1.5463.

Analysis for C$_7$H$_{14}$NO$_3$PS$_2$—Calculated: C, 32.93; H, 5.53; N, 5.49; P, 12.14; S, 25.13. Found: C, 32.84; H, 5.49; N, 5.48; P, 12.32; S, 25.32.

EXAMPLE 30

*Preparation of 2-diethoxyphosphinoylimino-4-o-chlorophenyl-1,3-dithiolane*

The procedure of Example 29 is repeated in every detail, except that for the 2-imino-1,3-dithiolane hydrochloride is substituted 2-imino-4-o-chlorophenyl-1,3-dithiolane hydrochloride The resultant oily product, 2-diethoxyphosphinoylimino-4-o-chlorophenyl-1,3-dithiolane, shows a strong >C=N— band at 1560 cm.$^{-1}$ by means of infrared analysis.

EXAMPLE 31

*Preparation of 2-diethoxyphosphinoylimino-4-methyl-1,3-dithiolane*

Repeating the procedure of Example 29 in every detail, except that 2-imino-4-methyl-1,3-dithiolane hydrochloride is employed in lieu of the 2-imino-1,3-dithiolane reactant therein, a good yield of 2-diethoxyphosphinoylimino-4-methyl-1,3-dithiolane is obtained. The product possesses a refractive index ($n_D^{25}$) equal to 1.5354 and analyzes as:

Calculated: C, 35.67; H, 5.99; N, 5.20; P, 11.50; S, 23.81. Found: C, 35.91; H, 6.09; N, 5.11; P, 11.73; S, 23.72.

EXAMPLE 32

*Preparation of 2-diisopropoxyphosphinothioylimino-1,3-dithiolane*

To a mixture of 32.5 parts of O,O-diisopropylphosphorochloridothioate and 26.5 parts of sodium bicarbonate in 25 parts of benzene and 50 parts of water are added 23.3 parts of 2-imino-1,3-dithiolane hydrochloride in 25 parts of water. After heating the mixture at 40° C. for four hours, the organic layer is separated and washed successively with dilute sodium hydroxide, dilute hydrochloric acid, water and saturated salt solution. Vacuum stripping leaves 43 parts of the crude product, or 85% of theory, which is reduced to 27.5 parts by low temperature recrystallization from an ether-hexane mixture. The product melts at about 10° C.

Analysis for C$_9$H$_{18}$NO$_2$PS$_3$—Calculated: C, 36.10; H, 6.06; N, 4.68; P, 10.35; S, 32.13. Found: C, 35.88; H, 5.69; N, 5.09; P, 10.64; S, 32.63.

EXAMPLE 33

*Preparation of 2-di-n-propyloxyphosphinothioylimino-1,3-dithiolane*

Following the procedure of Example 32 in every detail, except that O,O-di-n-propylphosphorochloridothioate is employed instead of O,O-diisopropylphosphorochloridothioate, the product 2-di-n-propyloxyphosphinothioyl-imino-1,3-dithiolane is recovered in good yield having a refractive index ($n_D^{25}$) equal to 1.5783.

Analysis for $C_9H_{18}NO_2PS_3$—Calculated: C, 36.10; H, 6.06; N, 4.68; P, 10.35; S, 32.13. Found: C, 36.11; H, 6.23; N, 4.93; P, 10.38; S, 32.19.

EXAMPLE 34

*Preparation of 2-diethoxyphosphinothioylimino-4-methyl-1,3-dithiolane*

To a mixture of 10.6 parts of sodium bicarbonate and 11.2 parts of O,O-diethylphosphorochloridothioate in 20 parts of water and 10 parts of benzene are added over 15 minutes 10.2 parts of 2-imino-4-methyl-1,3-dithiolane hydrochloride in 10 parts of water. After mixing for nineteen hours at room temperature, the reaction mixture is extracted several times with benzene. The combined benzene layers, after washing, drying and stripping in the usual manner, leave 15.2 parts of yellow oil. Molecular distillation at 114° C.–116° C./.001 mm. yields 9.7 parts of pure product, $n_D^{25}$ equal to 1.5814.

EXAMPLE 35

*Preparation of 2-ethoxyethylphosphinothioylimino-1,3-dithiolane*

To a mixture of 3.8 parts of O-ethyl ethylphosphonochloridothioate and 4.1 parts of sodium bicarbonate in 20 parts of water and 20 parts of benzene are added 3.7 parts of 2-imino-1,3-dithiolane hydrochloride in 10 parts of water over a ten minute period. After stirring at room temperature for thirty minutes, the mixture is heated at about 35° C. for two to three hours. The aqueous phase is separated, washed with benzene, and the combined benzene layers are washed successively with 5% potassium hydroxide, 5% hydrochloric acid, and saturated salt solution. Drying over magnesium sulfate followed by stripping off of solvent under vacuum leaves a viscous oil residue. Molecular distillation of the oil yields 3.4 parts of product as a colorless oil having a refractive index ($n_D^{25}$) equal to 1.6155.

Analysis for $C_7H_{14}NOPS_3$—Calculated: C, 32.91; H, 5.52; N, 5.48; P, 12.13; S, 37.66. Found: C, 32.98; H, 5.48; N, 5.49; P, 12.33; S, 37.68.

EXAMPLE 36

*Preparation of 2-ethoxydimethylaminophosphinothioylimino-1,3-dithiolane*

To a mixture consisting of 18.8 parts of N,N-dimethyl-O-ethyl-phosphoramidochloridothioate and 18.5 parts of sodium bicarbonate in 50 parts of water and 50 parts of benzene are slowly added 17.1 parts of 2-imino-1,3-dithiolane hydrochloride in 50 parts of water. The mixture is then stirred for about one day. The benzene phase is next separated and the water phase is extracted with fresh benzene. The combined benzene layers are washed with 5% hydrochloric acid, 5% potassium hydroxide, and with saturated salt solution, successively. After drying over magnesium sulfate, the mixture is stripped of solvent under vacuum to give 18.5 parts of a viscous oil. Molecular distillation of 10.0 parts of this oil affords 4.1 parts of product which crystallizes and, after recrystallization from isopropyl alcohol melts at 50° C.–51° C.

Analysis for $C_7H_{15}N_2OPS_3$—Calculated: C, 31.09; H, 5.59; N, 10.36; P, 11.46; S, 35.57. Found: C, 31.18; H, 5.68; N, 10.32; P, 11.57; S, 35.87.

EXAMPLE 37

*Preparation of 2-(ethoxydimethylaminophosphinothioylimino)-4-p-chlorophenyl-1,3-dithiolane*

Following the procedure of Example 36 in every detail, except that for the dithiolane hydrochloride reactant 2-imino-4-p-chlorophenyl-1,3-dithiolane hydrochloride is substituted, the resultant low-melting solid, 2-(ethoxydimethylaminophosphinothioylimino)-4-p-chlorophenyl - 1,3-dithiolane, shows a strong >N=C— band at 1565 cm.$^{-1}$ by means of infrared spectrum analysis.

EXAMPLE 38

*Preparation of 2-ethoxyphenylphosphinothioylimino-1,3-dithiolane*

To a mixture of 22.1 parts of 87% O-ethyl phenylphosphorochloridothioate, and 16.8 parts of sodium bicarbonate in 100 parts of water and 100 parts of benzene are added 15.6 parts of 2-imino-1,3-dithiolane hydrochloride in 125 parts of water over a ten minute period. After an additional ten minutes, the mixture is heated at 40° C. for one hour and is then allowed to stand overnight at room temperature. The aqueous phase is separated, washed with benzene, and the combined benzene layers are washed with 5% potassium hydroxide, 5% hydrochloric acid, and saturated salt solution, successively. After drying over magnesium sulfate, the solvent is removed under vacuum. The residual oil is dissolved in 100 parts of acetone, and the mixture is cooled to −15° C. to separate a solid by-product. Removal of the acetone leaves an oil which crystallizes on triturating with methanol. Repeated recrystallization from ethanol gives 8.5 parts of white crystalline product. The melting point of 63° C.–68° C. is unchanged by further recrystallizations.

Analysis for $C_{11}H_{14}NOPS_3$—Calculated: C, 43.54; H, 4.65; N, 4.62; P, 10.19; S, 31.70. Found: C, 43.65; H, 4.69; N, 4.80; P, 10.27; S, 31.70.

EXAMPLE 39

*Preparation of 2-diethoxyphosphinothioylimino-4-phenyl-1,3-dithiolane*

To a slurry of 13.9 parts of 2-imino-4-phenyl-1,3-dithiolane hydrochloride in 20 parts of water are slowly added 10.6 parts of sodium bicarbonate. After adding 11.2 parts of O,O-diethylphosphorochloridothioate in 10 parts of benzene, the reaction mixture is stirred for seventeen hours at room temperature. The benzene phase is separated and the aqueous phase extracted with additional benzene. The combined benzene layers, after washing, drying and stripping in the usual manner, leave 19.8 parts of crude product. Molecular distillation at 147° C.—150° C. at .001 mm. Hg pressure gives 14.7 parts of pure product, $n_D^{25}$ equal to 1.6202, whose analysis for $C_{13}H_{18}NO_2PS_3$ is:

Calculated: C, 44.92; H, 5.22; N, 4.03; P, 8.91; S, 27.67. Found: C, 44.76; H, 5.09; N, 4.11; P, 8.96; S, 27.82.

EXAMPLE 40

*Preparation of 2-diethoxyphosphinothioylimino-4-p-chlorophenyl-1,3-dithiolane*

Following the procedure of Example 39 in every detail, except that 2-imino-4-chlorophenyl-1,3-dithiolane hydrochloride is reacted instead of 2-imino-1,3-dithiolane hydrochloride, the resultant oily product, 2-diethoxyphosphinothioylimino-4-p-chlorophenyl-1,3 - dithiolane, obtained in good yield, shows an infrared absorption spectrum having a strong >C=N— band at 1560 cm.$^{-1}$.

EXAMPLE 41

*Preparation of 2-diethoxyphosphinothioylimino-4-p-sulfamylphenyl-1,3-dithiolane*

Following the procedure of Example 39 in every detail, except that for the 2-imino-1,3-dithiolane hydrochloride reactant 2-imino-4-p-sulfamylphenyl-1,3-dithiolane hydrochloride is substituted, resultant low-melting solid, 2-diethoxyphosphinothioylimino-4-p-sulfamylphenyl-1,3-dithiolane, shows an infrared absorption spectrum having a strong >C=N— band at 1555 cm.$^{-1}$.

EXAMPLE 42

*Preparation of 2-diethoxyphosphinothioylimino-4-m-carbethoxyphenyl-1,3-dithiolane*

Following the procedure of Example 39 in every detail, except that for the 2-imino-1,3-dithiolane hydrochloride, 2 - imino-4-m-carbethoxyphenyl-1,3-dithiolane hydrochloride is substituted, resultant oily product, 2-diethoxyphosphinothioylimino-4-m-carbethoxyphenyl - 1,3-dithiolane, shows an infrared absorption spectrum having a strong >C=N— band at 1550 cm.$^{-1}$.

EXAMPLE 43

*Preparation of 2-diethoxyphosphinylimino-4-p-nitrophenyl-1,3-dithiolane*

The procedure of Example 29 is followed in every detail, except that for the 2-imino-1,3-dithiolane hydrochloride reactant of that example, 2-imino-4-p-nitrophenyl-1,3-dithiolane hydrochloride is substituted. Resultant oily product, 2-diethoxyphosphinylimino-4-p-nitrophenyl-1,3-dithiolane, is recovered in good yield having an infrared absorption spectrum showing a strong >C=N— band at 1552 cm.$^{-1}$.

EXAMPLE 44

*Preparation of 2-diisopropyloxyphosphinylimino-5-m-methoxyphenyl-1,3-oxathiolane*

Following the procedure of Example 29 in every detail, except that for the 2-imino-1,3-dithiolane reactant of that example, 2-imino-5-m-methoxyphenyl-1,3-oxathiolane hydrochloride is substituted and for the O,O-diethylphosphorochloridate, O,O - diisopropylphosphorochloridate is substituted, an oily product, 2-diisopropyloxyphosphinylimino-5-m-methoxyphenyl-1,3-oxathiolane, is recovered having an infrared absorption spectrum showing a strong >C=N— band at 1545 cm.$^{-1}$.

EXAMPLE 45

*Preparation of 2-dimethoxyphosphinylimino-4-phenyl-1,3-dithiolane*

To a mixture of 8.0 parts of 2-imino-4-phenyl-1,3-dithiolane hydrochloride and 5.2 parts of O,O-dimethylphosphorochloridate in 50 parts of dry ether are added over a period of one hour 10.1 parts of triethylamine. After refluxing the mixture overnight, the ether is decanted, the remaining solids washed with ethyl acetate, and the ether-ethyl-acetate mixture is concentrated to yield 10.7 parts of crude product as an oil. The oil is remixed with methylene chloride and the mixture is washed successively with water, 5% hydrochloride acid, 5% sodium hydroxide, water and twice with saturated salt solution. Stripping off solvent leaves 8.3 parts, or 73% of theory of product, identified by infrared absorption spectrum and having a refractive index ($n_D^{25}$) equal to 1.6048.

Analysis for $C_{11}H_{14}NO_3PS_2$—Calculated: C, 43.55; H, 4.65; P, 10.21; S, 21.14. Found: C, 43.52; H, 4.85; P, 10.05; S, 21.01.

EXAMPLE 46

*Preparation of 2-diisopropylphosphinylimino-4-m-methylthiophenyl-1,3-dithiolane*

Following the procedure of Example 45 in every detail, except that for the dithiolane reactant 2-imino-4-m-methylthiophenyl-1,3-dithiolane hydrochloride is substituted, and for O,O-dimethylphosphorochloridate, O,O-diisopropylphosphorochloridate is substituted, 2-diisopropylphosphinylimino - 4-m-methylthiophenyl-1,3-dithiolane is obtained in good yield and possesses an infrared absorption spectrum having a strong >C=N— band at 1550 cm.$^{-1}$.

EXAMPLE 47

*Preparation of 2-ethoxymethylaminophosphinothiolylimino-1,3-dithiolane*

A mixture of 17.2 parts of 2-imino-1,3-dithiolane in 50 parts of water is added over a ten minute period to a mixture of 17.4 parts of O-ethyl-N-methylphosphoramidochloriodothioate and 18.2 parts of sodium bicarbonate in 50 parts of water and 50 parts of benzene. After stirring the mixture for twenty hours, the organic phase is separated, washed and then dried. Distillation of the solvent and molecular distillation of the resultant oil at 140° C.–144° C. at .001 mm. Hg afford 7.7 parts, or 30% of theory of pure product, refractive index ($n_D^{25}$) equal to 1.6269.

Analysis for $C_6H_{13}N_2OPS_3$—Calculated: C, 28.17; H, 5.11; N, 10.93; P, 17.09; S, 37.53. Found: C, 27.33; H, 5.26; N, 11.00; P, 17.23; S, 37.69.

EXAMPLE 48

*Preparation of 2-ethoxyethylphosphinoylimino-1,3-dithiolane*

To a dry vigorously stirred mixture of 15.7 parts of O-ethyl ethylphosphonyl chloride and 15.6 parts of 2-imino-1,3-dithiolane hydrochloride in 200 parts of acetone are added 20.2 parts of triethylamine over a seven minute period. During the addition, the temperature is maintained at 25° C. by cooling the reaction flask in an ice bath. After stirring the mixture maintained at room temperature for three additional hours, the triethylamine hydrochloride is collected. Concentration of the filtrate leaves an oil which, when mixed with 100 parts of ether, precipitates additional triethylamine hydrochloride. The oil obtained by filtration of the ether mixture is concentrated and molecularly distilled at 100° C.–106° C./.001 mm. Hg. The initial 11.9 parts of product are contaminated with triethylamine hydrochloride. Pure product amounting to 7.1 parts having a refractive index ($n_D^{25}$) equal to 1.5632 is then collected.

Analysis for $C_7H_{14}NO_2PS_2$—Calculated: C, 35.12; H, 5.90; N, 5.85; P, 12.94; S, 26.80. Found: C, 34.97; H, 6.02; N, 5.99; P, 13.06; S, 27.02.

EXAMPLE 49

*Preparation of 2-diethylphosphinothioyl-imino-1,3-dithiolane*

To a stirred mixture of 10.0 parts of diethylphosphinothioyl bromide, 7.8 parts of 2-imino-1,3-dithiolane hydrochloride and 200 parts of acetone are added 10.1 parts of triethylamine over a five minute period. The mildly exothermic reaction is maintained at 25° C. during the addition by external cooling. After stirring an additional four hours at room temperature, the mixture is filtered, the solvent is removed from the filtrate under reduced pressure, and the residual oil is partitioned between 150 parts of ether and 30 parts of water. The ether layer is washed successively with 5% hydrochloric acid, saturated salt solution, 5% potassium hydroxide, and saturated salt solution and is dried over magnesium sulfate. Concentration of the resulting mixture leaves 11.0 parts of viscous oil. Molecular distillation of the oil at 1 to 2µ affords several fractions of product. A yield of 4.5 parts of 2-diethylphosphinothioylimino-1,3-dithiolane, having a refractive index ($n_D^{25}$) equal to 1.6437 is obtained.

Analysis for $C_7H_{14}NPS_3$—Calculated: C, 35.12; H, 5.89; N, 5.85; P, 12.94; S, 40.18. Found: C, 34.95; H, 5.88; N, 6.00; P, 13.12; S, 40.24.

To illustrate the insecticidal, acaricidal and nematocidal activity of the phosphinyl imides of the present invention, the following example is presented:

EXAMPLE 50

This example establishes the effectiveness of the several imides defined in the table below as contact insecticides.

To each of the illustrative imides is added a 65/35 mixture of acetone/water in the several tabulated concentrations. In one test, pots containing two or three nasturtium plants two inches tall are infested with nasturtium aphids two days before they are selected for testing. The pots are placed on a turntable and then sprayed with the test compounds. The treated plants are removed to a holding room maintained at 70° F. and 60% relative humidity for forty-eight hours. A count of living and dead aphids is then made.

In a second test, the primary leaves of young lima bean plants infested with two-spotted spider mites are immersed for three seconds in each of the test solutions. The plants are dried in an air current and are held for forty-eight hours. A count of living and dead mites is finally made and the percentage mortality is recorded.

The effectiveness of the imides of the present invention as nematocides is demonstrated in the example following:

EXAMPLE 51

In two separate tests solutions of the hereinbelow defined imides are prepared and uniformly distributed throughout root-knot nematode (Meloidogyne sp.) infested soil at the rate of fifty pounds per acre. One of the solutions consists of 47 parts of 2-diethoxyphosphinothioylimino-1,3-dithiolane, 48 parts of xylene and 5 parts of surfactant, the calcium salt of oil-soluble polyethylene glycol ether, and the second solution consists of 47 parts of 2-dimethoxphosphinothioylimino-1,3-dithiolane, 48 parts of xylene and 5 parts of the above surfactant.

Seven days after treatment, tomato indicator plants are planted in the chemically treated infested soil and examined twenty-one days later to determine the extent or degree of nematode gall formation. It is noted that 95% to 100% control of the nematodes is obtained, thereby substantially fully protecting the plant species in nematode infested soil.

It is an advantage to utilize the insecticidal compounds of the present invention in dilute concentrations by incorporating the latter compounds in a variety of inert carriers or diluents. For instance, the compound may be dissolved in an inert organic solvent such as acetone, ethyl acetate, ethyl alcohol, benzene, kerosene or equivalents thereof; or the compound may be admixed with an inert solid carrier, as for example, fuller's earth, bentonite and the like. If desired, a suspension of the active compound may be prepared by incorporating a non-solvent therefor. In that event, it is advantageous to add thereto any commercially available dispersing or surface active agent of the anionic or nonionic types.

The quantity of inert solid or liquid carrier or diluent with respect to the insecticidal compound is not critical. It has, however, been found that up to 10% by weight of the compound based on the weight of the inert carrier is generally sufficient. In most cases, from 1% to about 5% of the active ingredient can be employed effectively.

I claim:
1. A phosphinyl imide having the formula:

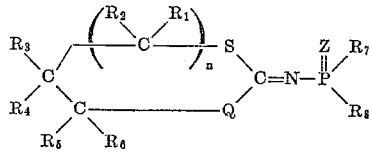

wherein $R_1$, $R_2$, $R_3$, $R_4$, $R_5$ and $R_6$ are each a radical selected from the group consisting of hydrogen, lower alkyl, lower carbalkoxy, halo-lower alkyl, phenyl, lower alkyl substituted-phenyl, nitrophenyl, halophenyl, cyanophenyl, methoxyphenyl, sulfamylphenyl, methylthiophenyl, (lower) carbalkoxyphenyl, carbamylphenyl, N-methylcarbamylphenyl, benzyl and naphthyl; $R_7$ and $R_8$ are each selected from the class consisting of lower alkyl, phenyl, lower alkoxy, lower monoalkylamino and lower dialkylamino radicals; Q and Z are each an atom selected from the group consisting of oxygen and sulfur; and $n$ is an integer from zero (0) to one (1).

2. 2-diethoxyphosphinothioylimino-1,3-dithiolane.
3. 2-diethoxyphosphinothioylimino-4-methyl-1,3-dithiolane.
4. 2-dimethoxyphosphinothioylimino-1,3-dithiolane.
5. 2-diethoxyphosphinothioylimino-1,3-oxathiolane.
6. 2-diethoxyphosphinothioylimino-1,3-dithiane.
7. 2-diethoxyphosphinothioylimino-4-phenyl-1,3-dithiolane.
8. 2-diethoxyphosphinylimino-1,3-dithiolane.
9. In the process for preparing a phosphinyl imide the step which comprises: reacting in the presence of an acidified lower monoalkanol a lower alkylene dithiol and a cyanogen halide in an inert organic solvent, said reactants being present in approximately equivalent quantities.
10. A process according to claim 9, in which the cyanogen halide is cyanogen chloride.
11. A process according to claim 9, in which the cyanogen halide is cyanogen bromide.
12. A process according to claim 9, in which the inert solvent is chloroform.
13. A process according to claim 9, in which the inert solvent is toluene.
14. A process according to claim 9, in which the acidified lower monoalkanol is hydrogen chloride-ethanol.

References Cited by the Examiner
UNITED STATES PATENTS 2,974,084  3/61  Mayhew et al. _____ 167—33
3,008,966  11/61  Hauptschein _____ 260—327

OTHER REFERENCES

Kosolapoff: Organophosphorus Compounds, Wiley and Sons, New York, pages 278–282.

Price et al.: Jour. Amer. Chem. Soc., vol. 75 (1953), pages 2396–2400.

Siegel et al.: Jour. Amer. Chem. Soc., vol. 8 (1958), pages 1753–5.

WALTER A. MODANCE, Primary Examiner.
NICHOLAS S. RIZZO, Examiner.